(12) United States Patent
Xu

(10) Patent No.: US 11,790,632 B2
(45) Date of Patent: Oct. 17, 2023

(54) METHOD AND APPARATUS FOR SAMPLE LABELING, AND METHOD AND APPARATUS FOR IDENTIFYING DAMAGE CLASSIFICATION

(71) Applicant: Advanced New Technologies Co., Ltd., Grand Cayman (KY)

(72) Inventor: Juan Xu, Hangzhou (CN)

(73) Assignee: Advanced New Technologies Co., Ltd., George Town (KY)

(*) Notice: Subject to any disclaimer, the term of this patent is extended or adjusted under 35 U.S.C. 154(b) by 401 days.

(21) Appl. No.: 17/141,607

(22) Filed: Jan. 5, 2021

(65) Prior Publication Data

US 2021/0124967 A1    Apr. 29, 2021

Related U.S. Application Data

(63) Continuation of application No. PCT/CN2019/095332, filed on Jul. 10, 2019.

(30) Foreign Application Priority Data

Aug. 24, 2018 (CN) .......... 201810975325.X

(51) Int. Cl.
  *G06V 10/46* (2022.01)
  *G06T 7/11* (2017.01)
  (Continued)

(52) U.S. Cl.
  CPC ........ *G06V 10/462* (2022.01); *G06F 18/2155* (2023.01); *G06F 18/24137* (2023.01);
  (Continued)

(58) Field of Classification Search
  CPC .......... G06F 18/24137; G06F 18/2155; G06F 18/23; G06F 18/214; G06F 18/40;
  (Continued)

(56) References Cited

U.S. PATENT DOCUMENTS 6,397,334 B1    5/2002    Chainer
7,093,129 B1    8/2006    Gavagni
(Continued)

FOREIGN PATENT DOCUMENTS

CN    104573715 A    4/2015
CN    105678297 A    6/2016
(Continued)

OTHER PUBLICATIONS

Hyungtae Lee et al.: "Fast Object Localization Using a CNN Feature Map Based Multi-Scale Search", arxiv.org, Cornell University Library, 201 Olin Library Cornell University Ithaca, NY 14853, Apr. 12, 2016, XP080695042, Section 3.2, Figure 3.
(Continued)

*Primary Examiner* — Mia M Thomas
(74) *Attorney, Agent, or Firm* — Seed IP Law Group LLP

(57) ABSTRACT

An embodiment provides a system and method for sample labeling. During operation, the system obtains a plurality of historical loss assessment images and obtains a plurality of candidate samples from the plurality of loss assessment images. A respective candidate sample comprises an image of a candidate damage area detected in a corresponding historical loss assessment image. The system clusters the plurality of candidate samples into a plurality of class clusters. For a respective class cluster, the system determines a center candidate sample set corresponding to a class cluster center of the respective class cluster, receives a manual labeling result associated with candidate samples in the determined center candidate sample set, and performs, according to the manual labeling result, damage classification labeling on other unlabeled candidate samples in the respective class cluster to obtain a plurality of labeled samples.

20 Claims, 8 Drawing Sheets

(51) Int. Cl.
- *G06F 18/214* (2023.01)
- *G06F 18/2413* (2023.01)
- *G06V 10/10* (2022.01)
- *G06V 10/762* (2022.01)
- *G06V 10/764* (2022.01)
- *G06V 10/778* (2022.01)
- *G06V 20/10* (2022.01)

(52) U.S. Cl.
CPC ............... *G06T 7/11* (2017.01); *G06V 10/17* (2022.01); *G06V 10/762* (2022.01); *G06V 10/764* (2022.01); *G06V 10/7784* (2022.01); *G06V 20/10* (2022.01); *G06T 2207/10004* (2013.01); *G06T 2207/20081* (2013.01); *G06T 2207/30252* (2013.01)

(58) Field of Classification Search
CPC .... G06V 10/762; G06V 10/462; G06V 10/17; G06V 10/764; G06V 20/10; G06V 2201/06; G06T 7/11; G06T 2207/20081; G06T 2207/30252; G06T 2207/10004; G06T 7/00

See application file for complete search history.

(56) References Cited

U.S. PATENT DOCUMENTS

| | | | |
|---|---|---|---|
| 7,401,012 B1 | 7/2008 | Bonebakker | |
| 7,872,584 B2 | 1/2011 | Chen | |
| 8,180,629 B2 | 5/2012 | Rehberg | |
| 8,448,226 B2 | 5/2013 | Narasimhan | |
| 8,966,613 B2 | 2/2015 | Horvitz | |
| 9,036,943 B1 | 5/2015 | Baldwin | |
| 9,582,843 B2 | 2/2017 | Leonard | |
| 9,607,138 B1 | 3/2017 | Baldwin | |
| 10,319,094 B1* | 6/2019 | Chen | G06N 3/08 |
| 10,475,014 B1 | 11/2019 | Ramalingam | |
| 10,554,738 B1 | 2/2020 | Ren | |
| 10,783,643 B1* | 9/2020 | Zhang | G06V 10/225 |
| 10,843,190 B2* | 11/2020 | Bachelet | G01N 21/6458 |
| 2001/0046659 A1 | 11/2001 | Oster | |
| 2002/0136459 A1 | 9/2002 | Imagawa | |
| 2003/0229789 A1 | 12/2003 | Morais | |
| 2004/0167765 A1 | 8/2004 | Abu El Ata | |
| 2004/0196363 A1 | 10/2004 | Diamond | |
| 2005/0232424 A1 | 10/2005 | Dobranski | |
| 2008/0015802 A1* | 1/2008 | Urano | G01N 21/9501 356/73 |
| 2009/0087025 A1 | 4/2009 | Ma | |
| 2009/0206993 A1 | 8/2009 | Di Mambro | |
| 2010/0128923 A1 | 5/2010 | Kiya | |
| 2010/0135490 A1 | 6/2010 | Kwon | |
| 2011/0069892 A1 | 3/2011 | Tsai | |
| 2011/0162679 A1 | 7/2011 | Demmeler | |
| 2011/0246409 A1* | 10/2011 | Mitra | G06F 17/18 702/179 |
| 2012/0269346 A1 | 10/2012 | Best | |
| 2013/0015946 A1 | 1/2013 | Lau | |
| 2013/0182002 A1 | 7/2013 | Macciola | |
| 2013/0208103 A1 | 8/2013 | Sands | |
| 2014/0037184 A1 | 2/2014 | Gorski | |
| 2014/0270411 A1 | 9/2014 | Shu | |
| 2014/0309805 A1 | 10/2014 | Ricci | |
| 2014/0313334 A1 | 10/2014 | Slotky | |
| 2015/0036891 A1 | 2/2015 | Takenouchi | |
| 2015/0103170 A1 | 4/2015 | Nelson | |
| 2015/0110364 A1 | 4/2015 | Niinuma | |
| 2015/0110366 A1 | 4/2015 | Sezille | |
| 2015/0341370 A1 | 11/2015 | Khan | |
| 2016/0034786 A1 | 2/2016 | Suri | |
| 2016/0044030 A1 | 2/2016 | Galwas | |
| 2016/0063235 A1 | 3/2016 | Tussy | |
| 2016/0283787 A1 | 9/2016 | Nepomniachtchi | |
| 2016/0307029 A1 | 10/2016 | Vaknin | |
| 2017/0048244 A1 | 2/2017 | Loughlin-McHugh | |
| 2017/0060867 A1 | 3/2017 | Moutinho | |
| 2017/0061563 A1 | 3/2017 | Falkenstern | |
| 2017/0148102 A1 | 5/2017 | Franke | |
| 2017/0293894 A1 | 10/2017 | Taliwal | |
| 2018/0047208 A1 | 2/2018 | Marin | |
| 2018/0082379 A1* | 3/2018 | Kelsh | G06Q 40/08 |
| 2018/0083973 A1 | 3/2018 | Paraskevas | |
| 2018/0182039 A1 | 6/2018 | Wang | |
| 2018/0247112 A1 | 8/2018 | Norimatsu | |
| 2018/0260793 A1* | 9/2018 | Li | G06Q 40/08 |
| 2018/0300576 A1 | 10/2018 | Dalyac | |
| 2019/0035112 A1 | 1/2019 | Lee | |
| 2019/0073641 A1 | 3/2019 | Utke | |
| 2019/0156178 A1 | 5/2019 | Thornton | |
| 2019/0266015 A1 | 8/2019 | Chandra | |
| 2019/0294878 A1 | 9/2019 | Endras | |
| 2019/0355366 A1 | 11/2019 | Ng | |
| 2020/0005151 A1 | 1/2020 | Jiang | |
| 2020/0034958 A1 | 1/2020 | Campbell | |
| 2020/0050939 A1 | 2/2020 | Zhu | |
| 2020/0051237 A1 | 2/2020 | Spivey | |
| 2020/0074215 A1* | 3/2020 | Wang | G06F 18/2431 |
| 2020/0175352 A1 | 6/2020 | Cha | |
| 2020/0349353 A1* | 11/2020 | Guo | G06V 20/20 |
| 2020/0349370 A1 | 11/2020 | Lambert | |
| 2020/0357111 A1* | 11/2020 | Wang | G06T 7/0002 |
| 2021/0090238 A1* | 3/2021 | Gallagher-Gruber | G02B 21/26 |

FOREIGN PATENT DOCUMENTS

| | | |
|---|---|---|
| CN | 107358596 A | 11/2017 |
| CN | 108197658 A | 6/2018 |
| WO | 2017059576 | 4/2017 |
| WO | 2018055340 | 3/2018 |

OTHER PUBLICATIONS

Zhou Huabing et al.: "Image Classification Based on Region of Interest Detection", Visual Communications and Image Processing; Jan. 20, 2004; San Jose; vol. 9813, Dec. 14, 2015, pp. 9813OU-9813OU, XP060063208, paragraph [0001]; figure 1.

W. Samek, T. Wiegand, and K.-R. Muller. (2017). Explainable artificial Intelligence: understanding, visualizing and interpreting deep learning models.: [Online]. Available: https://arxiv.org/abs/1708.08296 (Year: 2017).

Jeffery De Dejin, ("Automatic car damage recognition using convolutional neural networks", Internship report MSc Business Analytics Mar. 29, 2018, pp. 1-53, Vrije Universiteit Amsterdam Faculty of Science, Amsterdam)(Year:2018).

* cited by examiner

METHOD AND APPARATUS FOR SAMPLE LABELING, AND METHOD AND APPARATUS FOR IDENTIFYING DAMAGE CLASSIFICATION

RELATED APPLICATION

Under 35 U.S.C. § 120 and § 365(c), this application is a continuation of PCT Application No. PCT/CN2019/095332, entitled "METHOD AND APPARATUS FOR SAMPLE LABELING, AND METHOD AND APPARATUS FOR IDENTIFYING DAMAGE CLASSIFICATION," by inventor Juan Xu, filed 10 Jul. 2019, which claims priority to Chinese Patent Application No. 201810975325.X, filed on 24 Aug. 2018.

TECHNICAL FIELD

Embodiments of the present specification relate to the field of model training, and in particular to a method and apparatus for sample labeling, and a method and apparatus for identifying a damage classification.

BACKGROUND

In a vehicle insurance claim settlement scenario, user clients for claim settlement are commonly used in the current industry, which automatically identifies damage information such as damage components, and damage classification, and provides relevant claim information, such as repair schemes, amounts of compensation and the like according to an image of an accident vehicle uploaded by a user. Due to the absence of manual damage inspection, loss assessment, and loss verification, this scheme reduces the cost of insurance companies and improves the experience of ordinary users in vehicle insurance claim settlement.

In the current industry, when identifying damage information of the accident vehicle in an image, the image is usually compared with massive images in a historical database to identify a similar image in order to determine the damage information for the accident vehicle based on damage information corresponding to the similar image. This method requires a large quantity of calculations, and damage information determined based on this method has low accuracy. As such, there is a need for an appropriate method that determines the damage information for a vehicle in an image more quickly and accurately.

SUMMARY

In one method for sample labeling according to the present disclosure, massive loss assessment images are clustered first. Next, a received labeling result of manually labeling a portion of cluster centers with damage classifications is used to automatically label other images in class clusters containing the portion of cluster centers, thereby quickly obtaining massive weak label training samples, and accordingly a damage identification model can be trained on the basis of the weak label training samples.

According to a first aspect, an embodiment provides a system and method for sample labeling. During operation, the system obtains a plurality of historical loss assessment images and obtains a plurality of candidate samples from the plurality of loss assessment images. A respective candidate sample comprises an image of a candidate damage area detected in a corresponding historical loss assessment image. The system clusters the plurality of candidate samples into a plurality of class clusters. For a respective class cluster, the system determines a center candidate sample set corresponding to a class cluster center of the respective class cluster, receives a manual labeling result associated with candidate samples in the determined center candidate sample set, and performs, according to the manual labeling result, damage classification labeling on other unlabeled candidate samples in the respective class cluster to obtain a plurality of labeled samples.

In a variation on this embodiment, the candidate damage area in the corresponding historical loss assessment image is detected using a saliency detection technique. Detecting the candidate damage area further comprises detecting a salient object in the corresponding historical loss assessment image and determining a minimum rectangular area surrounding the detected salient object.

In a variation on this embodiment, clustering the plurality of candidate samples into a plurality of class clusters comprises extracting a feature vector from each of the plurality of candidate samples to obtain a plurality of feature vectors and clustering the plurality of feature vectors to obtain the plurality of class clusters.

In a variation on this embodiment, determining the center candidate sample set corresponding to the class cluster center of the respective class cluster comprises determining a predetermined number of candidate samples that are closest to the corresponding class cluster center in the respective class cluster and including the determined predetermined number of candidate samples in the center candidate sample set.

In a variation on this embodiment, the system uses the plurality of labeled samples to train a damage identification model, which is configured to identify damage classifications of vehicle damages from images.

In a further variation, the system selects a candidate sample from the plurality of candidate samples; predicts, based on the damage identification model, a damage classification corresponding to the selected candidate sample; receives a manual correction of the predicted damage classification; labels the selected candidate sample based on the manual correction; and use the labeled selected candidate sample to perform further training on the damage identification model.

According to a second aspect, a method for identifying a damage classification is provided. The method comprises: obtaining a current loss assessment image; and inputting the current loss assessment image to the damage identification model of any of the embodiments of the first aspect, and predicting a damage classification corresponding to the current loss assessment image.

According to a third aspect, an apparatus for sample labeling is provided. The apparatus comprises: an acquisition unit configured to acquire a plurality of historical loss assessment images; a first determining unit configured to determine, on the basis of saliency detection, a plurality of candidate damage areas from the plurality of historical loss assessment images, and regard images of the plurality of candidate damage areas as a plurality of candidate samples; a clustering unit configured to cluster the plurality of candidate samples into a plurality of class clusters; a second determining unit configured to determine a plurality of center candidate sample sets respectively corresponding to class cluster centers of the plurality of class clusters; a receiving unit configured to receive a manual labeling result, the manual labeling result being obtained by performing damage classification labeling on at least a portion of the center candidate sample sets from the plurality of center candidate sample sets, wherein respective center candidate samples in the same center candidate sample set are labeled with the same damage classification; and a labeling unit configured to perform, according to the manual labeling result, damage classification labeling on other candidate samples in the class clusters to which the at least a portion of the center candidate sample sets belong so as to obtain a plurality of labeled samples labeled with damage classifications.

According to a fourth aspect, an apparatus for identifying a damage classification is provided. The apparatus comprises: an acquisition unit configured to acquire a current loss assessment image; and a predicting unit configured to input the current loss assessment image to the damage identification model of any of the embodiments of the first aspect or the third aspect and predict a damage classification corresponding to the current loss assessment image.

According to a fifth aspect, a computer-readable storage medium with a computer program stored thereon is provided. The computer program, when executed on a computer, causes the computer to execute the method described in the first aspect or the second aspect.

According to a sixth aspect, a computing device is provided. The computing device comprises a memory and a processor, and is characterized in that the memory stores executable code, and the processor, when executing the executable code, implements the method described in the first aspect or the second aspect is implemented.

In the method for sample labeling disclosed in the embodiments of the present specification, a plurality of candidate damage areas of massive loss assessment images are identified by saliency detection firstly, then the candidate damage areas are clustered, and according to the labeling result where the damage classifications of the areas corresponding to a portion of class cluster centers are manually labeled, other candidate areas of the class clusters where the portion of class cluster centers are located are automatically labeled. As such, massive training samples can be obtained, and thus the damage identification model may be trained using these training samples.

BRIEF DESCRIPTION OF THE DRAWINGS

To describe technical schemes of the embodiments disclosed herein more clearly, the accompanying drawings for describing the embodiments are briefly introduced below. It is apparent that the accompanying drawings described below are only the embodiments disclosed herein, and those of ordinary skill in the art may still acquire other drawings from these accompanying drawings without creative efforts.

DETAILED DESCRIPTION

The plurality of embodiments disclosed by the specification are described below with reference to the accompanying drawings.

Embodiments of the present specification discloses a method for sample labeling, and training samples obtained based on the method can be used to train a damage identification model. An application scenario for the damage identification model is first introduced below.

Figure 1:
FIG. 1 illustrates an image of a part of a vehicle according to an embodiment.
Figure 2:
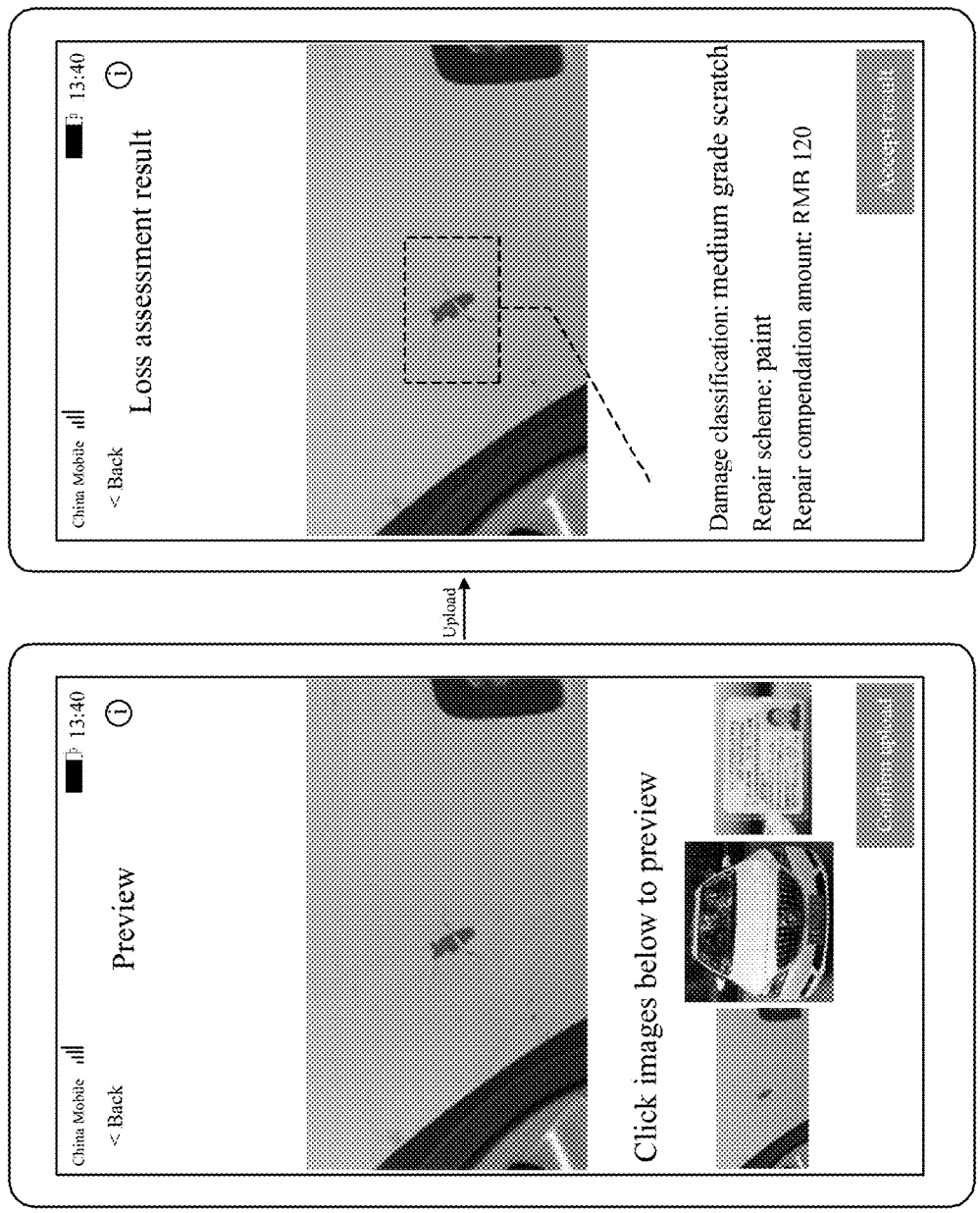
FIG. 2 illustrates a schematic diagram of the changes in an interface of a loss assessment client according to an embodiment.

The damage identification model can be applied to a loss assessment client provided to a user. According to one example, at the scene of the accident, a user can capture an image, such as a partial image of a vehicle as shown in FIG. 1, of the accident scene through a terminal, such as a mobile phone, a tablet computer, etc., and upload the captured image to the loss assessment client in the terminal; then the loss assessment client can use the damage identification model to determine vehicle damage information corresponding to the image of accident scene. For example, as shown in FIG. 2, the loss assessment client can determine that vehicle damage classification is medium grade scratch; further, it can provide a repair scheme corresponding to the damage information and the associated compensation amount, for example, the repair scheme is paint repair and repair compensation amount is RMB 120.

In one embodiment, training of the damage identification model can be performed based on a large number of manual labeling samples. In such an scheme, a large number of historical loss assessment images can be acquired from the insurance company, such as images captured by loss adjusters of insurance company at the accident scene, then damage objects of the loss assessment images and corresponding damage classifications can be labeled by labeling staff, and these labeled samples are used as training samples to train the damage identification model. However, such a scheme has a very high cost of manual labeling, and therefore, it is difficult to implement.

Based on the above description, embodiments of the present specification disclose a method for sample labeling, wherein a plurality of candidate damage areas within massive loss assessment images are identified by saliency detection firstly, then the candidate damage areas are clustered, and according to the labeling result where the damage classifications of the areas corresponding to a portion of class clustering centers are manually labeled, other candidate areas of the class clusters where the portion of class cluster centers are located are automatically labeled. As such, massive training samples can be obtained, and thus the damage identification model may be trained using the training samples. The detailed implementation steps of the above process are described below.

Figure 3:
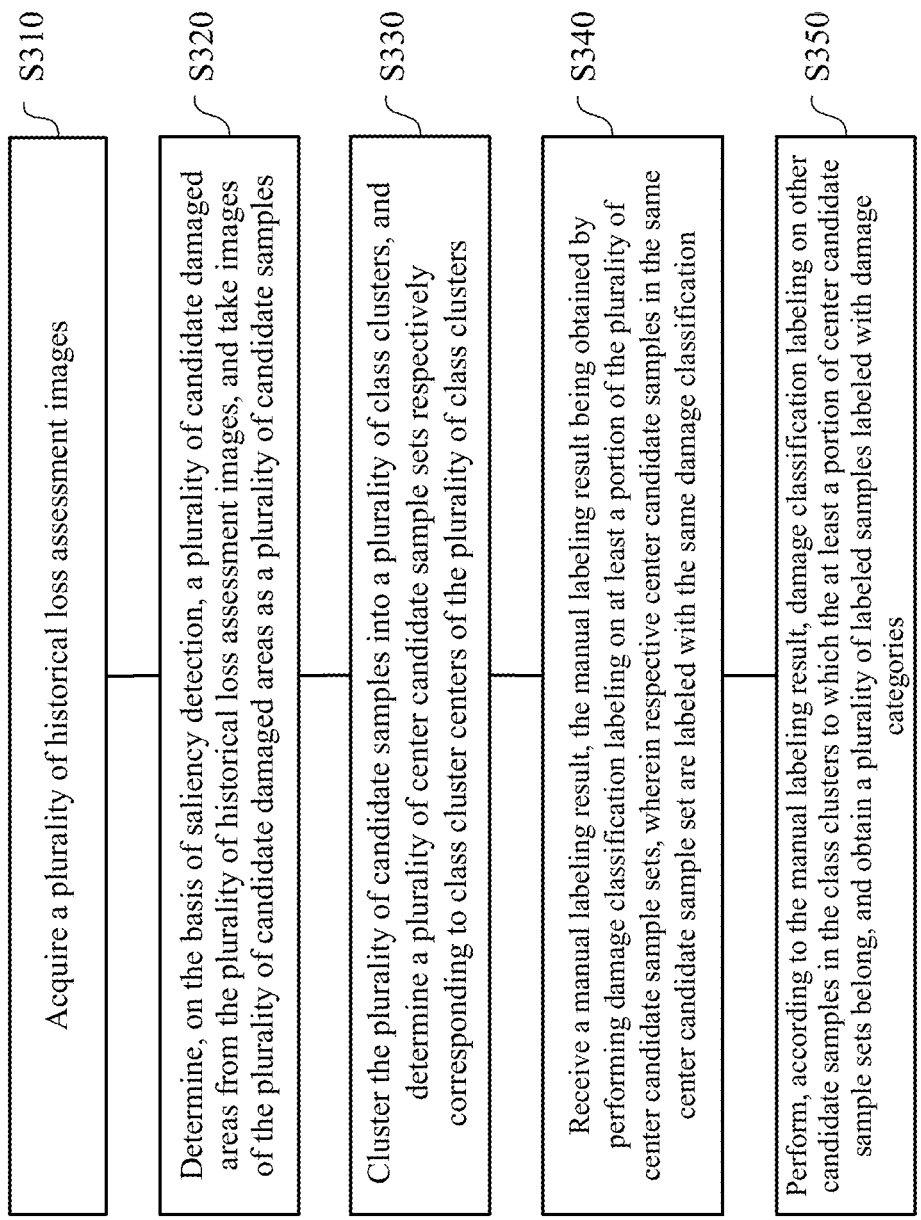
FIG. 3 illustrates a flowchart of a method for sample labeling according to an embodiment.

FIG. 3 illustrates a flowchart of a method for sample labeling according to an embodiment, and the executive subject of the method may be a device with processing capabilities: a server, a system, or an apparatus. As shown in FIG. 3, the process of the method comprises the following steps: step S310, acquiring a plurality of historical loss assessment images; step S320, employing saliency detection to determine a plurality of candidate damage areas from the plurality of historical loss assessment images, and use images of the plurality of candidate damage areas as a plurality of candidate samples; step S330, clustering the plurality of candidate samples into a plurality of class clusters, and determining a plurality of center candidate sample sets respectively corresponding to class cluster centers of the plurality of class clusters; step S340, receiving a manual labeling result, the manual labeling result being obtained by performing damage classification labeling on at least a portion of center candidate sample sets of the plurality of center candidate sample sets, wherein respective center candidate samples of the same center candidate sample set are labeled with the same damage classification; and step S350, performing, according to the manual labeling result, performing damage classification labeling on other candidate samples in the class clusters to which the at least a portion of center candidate sample sets belong to obtain a plurality of labeled samples labeled with damage classifications.

Firstly, at step S310, a plurality of historical loss assessment images are acquired.

In one embodiment, historical loss assessment images can be acquired from the database of an insurance company. In another embodiment, historical loss assessment images can also be acquired from forums or news sites related to traffic accidents.

In one embodiment, a plurality of historical loss assessment images may contain images reflecting different information of an accident vehicle, for example, images reflecting information such as damage, vehicle plate number, vehicle model, etc. In one example, historical loss assessment images may comprise partial or global images reflecting vehicle damage of the vehicle bodies. In another example, historical loss assessment images may comprise a captured image of a driver's license or a vehicle license. In other words, the historical loss assessment images may contain image content not directly related to damage object.

After acquiring a plurality of historical loss assessment images, then at step S320, by employing saliency detection, images of a plurality of candidate damage areas are determined from the plurality of historical loss assessment images as a plurality of candidate samples.

It should be noted that the saliency detection (or referred to as a visual attention mechanism) refers to extracting a salient object (i.e., an object of human interest) in an image by simulating a human's visual characteristics with an intelligent algorithm. In general, salient objects have a certain structure and texture, a strong stimulation in color, and the salient objects are quite different from surrounding areas. Based on these simple saliency detection principles, saliency detection can be realized.

For the historical loss assessment images acquired at step S310, because while the loss adjuster is capturing an image of vehicle damage, his purpose is to clearly reflect the damage object, the damage object is usually located in the central part of image, and there is usually a large difference between the damage object and other parts of vehicle body in color, structure, and texture. Therefore, if a historical loss assessment image contains damage object information, the damage object in the image can be quickly located by employing saliency detection for the central region of the image.

Figure 4:
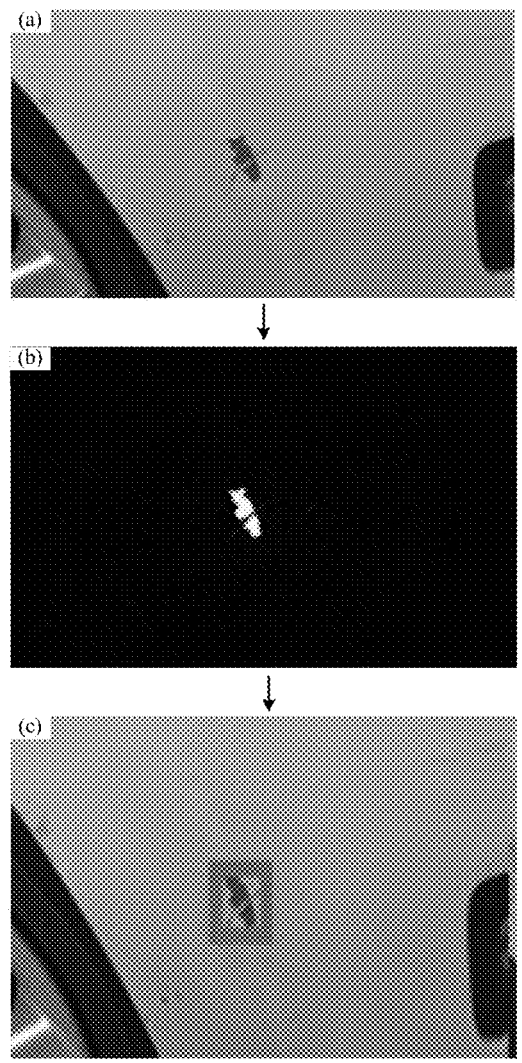
FIG. 4 illustrates a schematic workflow of the identification of a candidate damage area according to an embodiment.

Further, according to one specific embodiment, identifying a plurality of candidate damage areas may comprise: firstly identifying a salient object in each of the plurality of historical loss assessment images by employing saliency detection, then determining a minimum rectangular area where the salient object is located, and using the minimum rectangular area as a corresponding candidate damage area. In one example, determining a minimum rectangular area may comprise: determining a minimum rectangular area based on coordinate information of the salient object, for example, the coordinate information may comprise the coordinates of the uppermost, the lowermost, the leftmost, and the rightmost points in the salient object. According to one specific example, the saliency map shown in (b) of FIG. 4 may be obtained according to the partial image of the vehicle body shown in FIG. 4, wherein the white part is the detected salient object, and then the minimum rectangular area containing the salient object shown in (c) of FIG. 4 can be determined and used as a candidate damage area.

In one embodiment, one or a plurality of candidate damage areas may be identified from a particular historical loss assessment image.

According to above description, a plurality of candidate damage areas may be obtained, and images of the plurality of candidate damage areas may be used as a plurality of candidate samples. It should be noted that, since other vehicle information may also be included in the historical loss assessment images, salient objects identified from the images by employing saliency detection may comprise non-damage objects, such as other unrelated components of vehicles, objects in the background, certificates of users, etc. Therefore, a portion of the plurality of candidate samples formed may comprise no damage object.

For the candidate samples obtained as above, then at step S330, the plurality of candidate samples are clustered into a plurality of class clusters, and a plurality of center candidate sample sets respectively corresponding to class cluster centers of the plurality of class clusters are determined.

In one embodiment, clustering a plurality of candidate samples into a plurality of class clusters may comprise: firstly, determining, on the basis of an image feature extraction model, a feature vector corresponding to each of the plurality of candidate samples so as to obtain a plurality of feature vectors; and then clustering the plurality of feature vectors to obtain the plurality of class clusters. Further, it should be noted that an existing image feature extraction model can be employed to determine the feature vectors, e.g., an ImageNet trained ResNet model, or a Histogram of Oriented Gradient (HOG) feature extraction model, which is not limited here.

In one embodiment, a plurality of candidate samples may be clustered into a plurality of class clusters by employing a variety of existing clustering algorithms. Among them, a variety of clustering algorithms may comprise partitioning clustering algorithms such as K-MEANS algorithm, K-MEDOIDS algorithm, CLARANS algorithm, etc.; hierarchical clustering algorithms such as BIRCH algorithm, CURE algorithm, CHAMELEON algorithm, etc.; and density-based clustering algorithms such as DBSCAN algorithm, OPTICS algorithm, and DENCLUE algorithm, etc. In one specific embodiment, when employing K-MEANS algorithm, the number of clusters K needs to be preset, and the larger the value of K, the more class clusters can be obtained by clustering, and the higher the resolution of classification will be. Specifically, a staff member can gradually adjust K based on operating experience and the feedback result of the clustering, in order to obtain a plurality of appropriate class clusters.

According to above description, a plurality of class clusters may be obtained, and each class cluster comprises a corresponding class cluster center, and then each center candidate sample set corresponding to each class cluster center can be determined.

According to one embodiment, a predetermined number of center candidate samples in each class cluster closest to the corresponding class cluster center are determined, and the determined predetermined number of center candidate samples are used to construct a corresponding center candidate sample set. It should be noted that, in general, the predetermined number is significantly less than the total number of candidate samples in each class cluster. In one example, one class cluster comprises 10,000 candidate samples, and the predetermined number may be 50 or 100, and so on.

According to one clustering algorithm employed in one embodiment, the class cluster center corresponds to a vector in mathematics, that is, a point in the vector space mapped by the feature vector of each image, referred to as a center point. In such a case, a plurality of candidate samples corresponding to a predetermined number of feature vectors closest to the center point are used to construct the center candidate sample sets of the class cluster.

According to method above, a plurality of center candidate sample sets corresponding to the plurality of class cluster centers may be obtained, and then these center candidate sample sets may be provided to the labeling staff to label corresponding damage classifications. Further, in one specific embodiment, historical loss assessment images corresponding to center candidate sample sets may be provided to labeling staff, and candidate damage areas corresponding to the center candidate sample sets may be identified in the historical loss assessment images. In another specific embodiment, only the candidate damage areas corresponding to center candidate sample sets may be displayed to the labeling staff, for example, a sub-image corresponding to the candidate damage area may be cut from a historical loss assessment image and provided to the labeling staff.

Then, at step S340, a manual labeling result is received, the manual labeling result being obtained by performing damage classification labeling on at least a portion of center candidate sample sets from the plurality of center candidate sample sets, wherein respective center candidate samples within the same center candidate sample set are labeled with the same damage classification.

It should be noted that, in general, instead of only selecting a single center candidate sample corresponding to the class cluster center and providing it to the operator, a plurality of center candidate samples in each class cluster are selected to construct a center candidate sample set and provided to the operator to label the damage classification corresponding to the class cluster. The reason for this is that providing a plurality of center candidate samples corresponding to each class cluster can allow the operator to determine and label the damage classification of each class cluster more accurately.

As previously mentioned, a portion of the plurality of candidate samples formed at step S320 may comprise no damage object. After the clustering at step S330, samples containing similar salient objects will be clustered into the same class cluster, and the center candidate sample set corresponding to the class cluster center can reflect the most typical salient object in the class cluster. Among all the determined center candidate sample sets, there will also be some salient objects in the center candidate sample sets that are not damage objects, but other objects in accident scene, such as trash cans, trees, passersby, certificates, or undamaged vehicle components, etc. Accordingly, labeling staff can filter all the center candidate sample sets firstly, and then only the center candidate sample sets comprising damage objects are labeled, that is, the damage classifications of only at least a portion of center candidate sample sets from a plurality of center candidate sample sets are labeled.

In one embodiment, in the manual labeling result, any two center candidate sample sets of the plurality of center candidate sample sets can correspond to the same or different damage classifications.

According to one specific example, assuming that 1,000,000 candidate samples are identified from historical loss assessment images, which are clustered into 100 class clusters with an average of 10,000 samples per class cluster by clustering at step S330. Next, 100 center candidate sample sets corresponding to the 100 class clusters are provided to labeling staff for labeling, where each center candidate sample set comprises 100 center candidate samples. The labeling staff can first exclude 45 sample sets with non-damage objects from the 100 sample sets, and only label the remaining 55 center candidate sample sets with a total of 5500 center candidate samples. Since the center candidate sample set is a typical representative of candidate samples in the class cluster, excluding 45 center candidate sample sets means that all candidate samples (450,000) corresponding to the 45 class clusters are excluded and do not need to be labeled. Accordingly, large amounts of interference samples are excluded by clustering operations and simple filtering, greatly reducing labor costs. The labeling staff only needs to label a very small number of center candidate sample sets.

According to one specific example, the manual labeling result may comprise: the damage classification of center candidate sample set A is light scratching, the damage classification of center candidate sample sets B and C is medium grade deformation, and the damage classification of center candidate sample set D is severe deformation, and the like.

According to above description, a manual labeling result of manually labeling damage classifications of at least a portion of the plurality of center candidate sample sets can be obtained. Then, at step S350, according to the manual labeling result, damage classifications of other candidate samples in the class clusters to which the at least a portion of center candidate sample sets belong are labeled to obtain a plurality of labeled samples labeled with damage classifications.

In one embodiment, other candidate samples in class clusters where center candidate sample sets labeled with damage classifications are located may be labeled with the same damage classification as the center candidate sample set. In one specific example, there are 10,000 candidate samples in a class cluster in which 100 center candidate samples in the center candidate sample set are manually labeled as severe deformation, and accordingly, the other 9900 candidate samples may be automatically labeled as severe deformation. Therefore, by labeling a small number of center candidate sample sets, other candidate samples can be automatically labeled.

According to above description, a plurality of labeled samples labeled with damage classifications are obtained based on lightweight manual labeling. Specifically, in the above example of 1,000,000 candidate samples, only 55 center candidate sample sets, a total of 5500 center candidate samples, are manually labeled after clustering the candidate samples into 100 class clusters, and then accordingly other samples in class clusters are automatically labeled, thus obtaining 550,000 labeled samples. Samples labeled this way can be referred to as weak labeled samples.

It should be noted that, after step S350, the method can include using the plurality of labeled samples obtained above as a first training sample set to train a damage identification model.

In one embodiment, the damage identification model may be trained based on the existing classification algorithms. In one example, the classification algorithms may comprise Bayesian classification algorithm, support vector machine, artificial neural network, integrated learning, and so on, which are not limited here.

By performing the method for sample labeling provided by the embodiments of this specification, a large number of labeled samples are obtained based on a small amount of manual labeling, which in turn can result in a damage identification model with certain accuracy, thus solving the problem of the damage detection model requiring a large amount of manual labeling cost.

Further, in order to improve the accuracy of the above-mentioned damage identification model, a certain number of candidate samples can be pre-labeled with damage identification model trained by massive weak label data, then manual check and correction are performed to obtain a training set having undergone manual check and modification, and then based on this training set, the damage identification model is further trained. The above process is described below with reference to FIG. 5.

Figure 5:
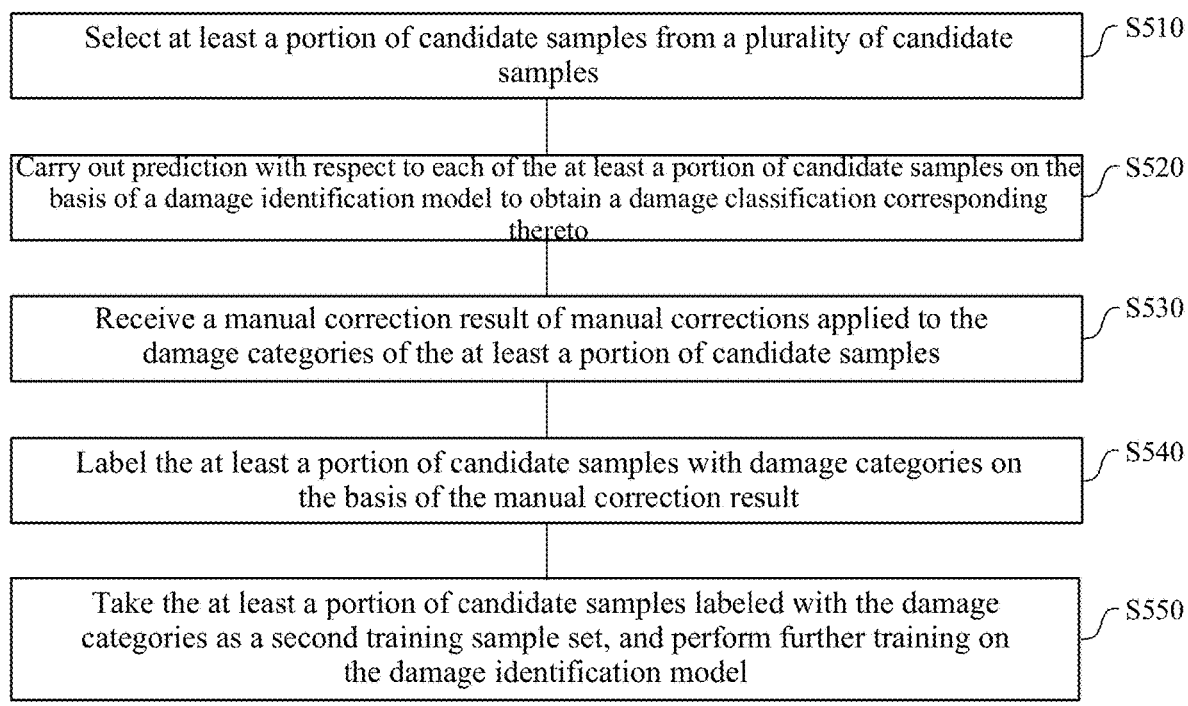
FIG. 5 illustrates a flowchart of an optimized training method of a damage identification model according to an embodiment.

FIG. 5 illustrates a flowchart of an optimized method for training a damage identification model according to an embodiment. As shown in FIG. 5, the method may comprise the following steps.

Firstly, at step S510, at least a portion of candidate samples are selected from a plurality of candidate samples.

In one embodiment, a predetermined number of candidate samples may be randomly selected from the plurality of candidate samples identified at aforementioned step S320, and the candidate samples determined this way may comprise negative samples in which the salient object is not damage object, and the predetermined number may be flexibly selected according to actual accuracy requirements. In another embodiment, a predetermined number of candidate samples may be selected from each class cluster in accordance with a fixed proportion or randomly.

After selecting at least a portion of candidate samples, at step S520, a corresponding damage classification for each of the at least a portion of candidate samples is predicted based on the damage identification model.

Specifically, the selected at least a portion of the candidate samples are input to the aforementioned damage identification model resulting from training to obtain a corresponding damage classification for each candidate sample. It should be noted that because the aforementioned damage identification model is obtained based on training using weak label data, and the accuracy of these weak labels does not meet a very high requirement, the accuracy of the initial damage identification model obtained by training does not reach a very high level, and there may be some errors in the predicted damage classifications.

Accordingly, further, in one embodiment, the candidate samples with the damage classification predicted at step S520 are provided to labeling staff, so that the labeling staff can check and correct the predicted damage classification. At step S530, a manual correction result of manual corrections applied to the damage classifications of the at least a portion of candidate samples is received. Then, at step S540, based on the manual correction result, the at least a portion of candidate samples are labeled with damage classifications.

Next, at step S550, the at least a portion of candidate samples labeled with damage classifications are used as a second training sample set to perform further training on the damage identification model.

As such, a certain number of more accurate second set of training samples can be obtained by such low-cost manual labeling of check and correction, and then the damage identification model can be further trained based on the second set of training samples to improve the accuracy of the damage identification model.

According to an embodiment of another aspect, provided is a method for identifying a damage classification that can be performed based on the damage identification model trained in the previous embodiments. Specifically, the method may comprise: firstly, acquiring a current loss assessment image; and then, inputting the current loss assessment image into the damage identification model provided in any of the previous embodiments to predict with respect a damage classification corresponding to the current loss assessment image.

Figure 6:
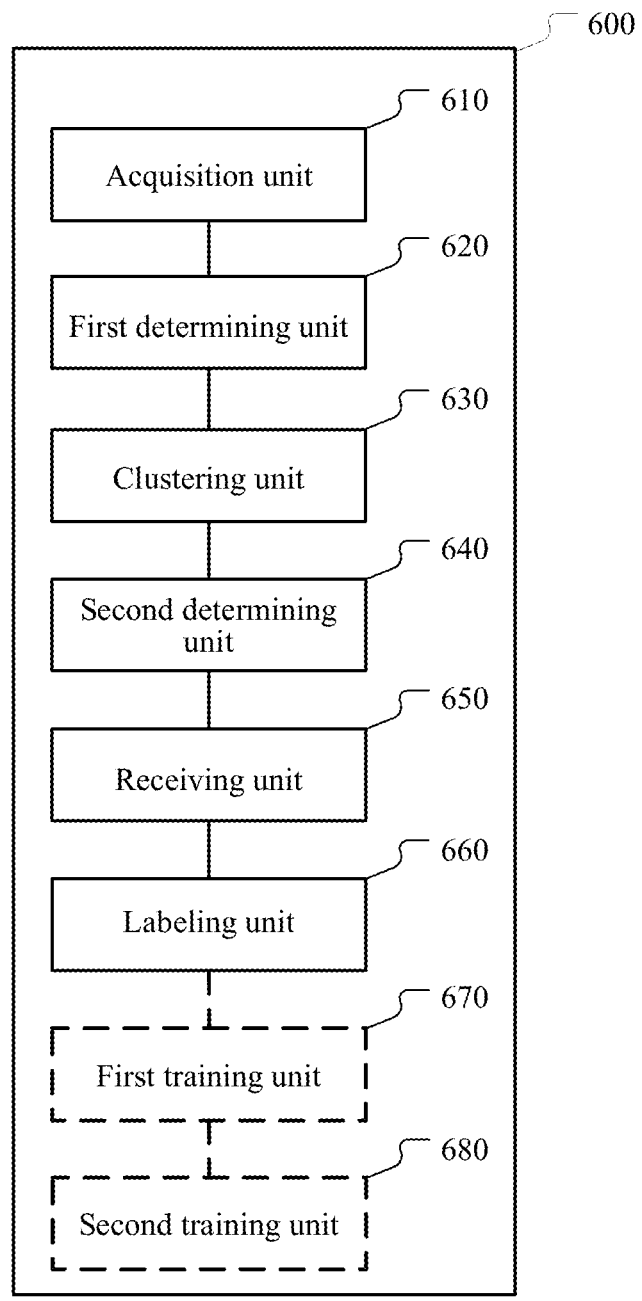
FIG. 6 illustrates a structural diagram of an apparatus for sample labeling according to an embodiment.

According to an embodiment of another aspect, provided is an apparatus for sample labeling. FIG. 6 illustrates a structural diagram of an apparatus for sample labeling according to an embodiment. As shown in FIG. 6, apparatus 600 comprises:

an acquisition unit 610 configured to acquire a plurality of historical loss assessment images;

a first determining unit 620 configured to determine, on the basis of saliency detection, a plurality of candidate damage areas from the plurality of historical loss assessment images, and use images of the plurality of candidate damage areas as a plurality of candidate samples;

a clustering unit 630 configured to cluster the plurality of candidate samples into a plurality of class clusters;

a second determining unit 640 configured to determine a plurality of center candidate sample sets respectively corresponding to class cluster centers of the plurality of class clusters;

a receiving unit 650 configured to receive a manual labeling result, the manual labeling result being obtained by performing damage classification labeling on at least a portion of the plurality of center candidate sample sets, wherein respective center candidate samples in the same center candidate sample set are labeled with the same damage classification; and a labeling unit 660 configured to perform, according to the manual labeling result, damage classification labeling on other candidate samples in the class clusters to which the at least a portion of center candidate sample sets belong to obtain a plurality of labeled samples labeled with damage classifications.

According to one embodiment, the first determining unit 620 is specifically configured to:

detect a salient object in each of the plurality of historical loss assessment images; and determine a minimum rectangular area where the salient object is located and use the minimum rectangular area as a corresponding candidate damage area.

According to one embodiment, the clustering unit 630 is specifically configured to:

determine, on the basis of an image feature extraction model, a feature vector corresponding to each of the plurality of candidate samples so as to obtain a plurality of feature vectors; and cluster the plurality of feature vectors to obtain the plurality of class clusters.

According to one embodiment, the second determining unit 640 is specifically configured to:

determine a predetermined number of center candidate samples in each class cluster closest to the corresponding class cluster center, and using the predetermined number of center candidate samples to construct a corresponding center candidate sample set.

According to one embodiment, the apparatus further comprises a first training unit 670 configured to use the plurality of labeled samples as a first training sample set to train a damage identification model, the damage identification model being used to identify damage classifications of damages on vehicles from images.

According to one embodiment, the apparatus further comprises a second training unit 680 configured to:

select at least a portion of candidate samples from the plurality of candidate samples;

based on the damage identification model, predict a damage classification corresponding to each of the at least a portion of candidate samples;

receive a manual correction result of manual corrections applied to the damage classifications of the at least a portion of candidate samples;

label the at least a portion of candidate samples with damage classifications based on the manual correction result; and use the at least a portion of candidate samples labeled with the damage classifications as a second training sample set to perform further training on the damage identification model.

In summary, by employing the apparatus for sample labeling provided by the embodiments of this specification, a large number of labeled samples can be obtained by manually labeling a small number of samples, such that a damage identification model with certain accuracy can be obtained on the basis of these labeled samples, thereby solving the problem of a damage detection model requiring large amounts of manual labeling costs.

According to an embodiment of yet another aspect, provided is an apparatus for identifying a damage classification that can be operated based on the damage identification model trained in the previous embodiments. Specifically, the apparatus may comprise: an acquisition unit configured to acquire a current loss assessment image; and a predicting unit configured to input the current loss assessment image into the damage identification model provided in any of the previous embodiments to predict a damage classification corresponding to the current loss assessment image.

As mentioned above, according to an embodiment of yet another aspect, a computer-readable storage medium with a computer program stored thereon is further provided. The computer program, when executed on a computer, causes the computer to execute the method described with reference to FIG. 3 or FIG. 5.

According to an embodiment of yet another aspect, a computing device comprising a memory and a processor is further provided. The memory stores executable code, and the processor, when executing the executable code, implements the method described with reference to FIG. 3 or FIG. 5.

Figure 7:
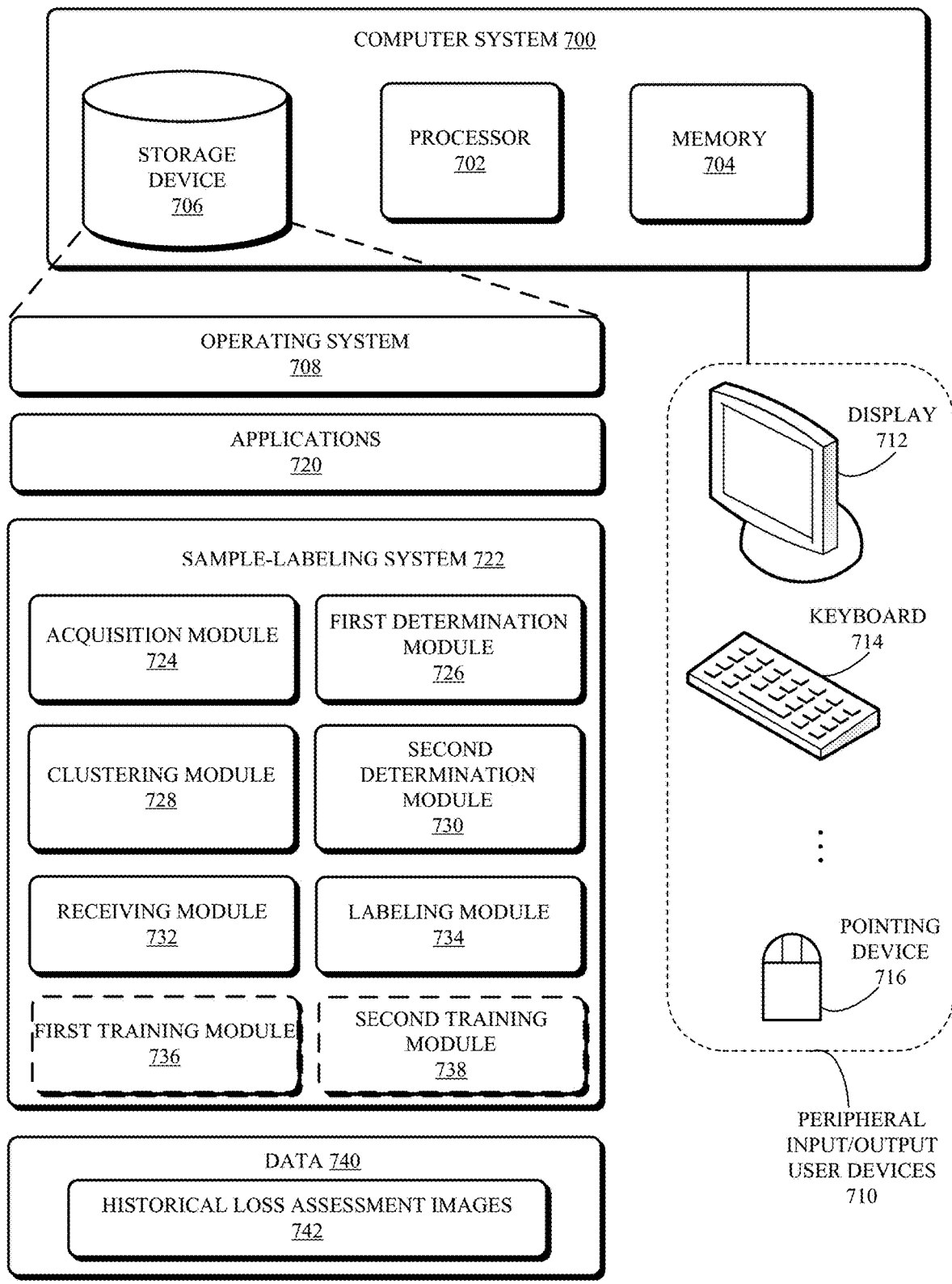
FIG. 7 illustrates an exemplary computer and communication system for sample labeling according to one embodiment.

FIG. 7 illustrates an exemplary computer and communication system for sample labeling according to one embodiment. In FIG. 7, computer system 700 can include a processor 702, a memory 704, and a storage device 706. Furthermore, computer system 700 can be coupled to peripheral input/output (I/O) user devices 710, e.g., a display device 712, a keyboard 714, and a pointing device 716. Storage device 706 can store an operating system 708, one or more applications 720, a sample-labeling system 722, and data 740.

Applications 720 can include instructions, which can be loaded from storage device 706 into memory 704 and executed by processor 702. As a result, computer system 700 can perform specific functions provided by applications 720.

Sample-labeling system 722 can include instructions, which when executed by computer system 700, can cause computer system 700 or processor 702 to perform methods and/or processes described in this disclosure. Specifically, sample-labeling system 722 can include instructions for acquiring a plurality of historical loss assessment images (acquisition module 724), instructions for determining a plurality of candidate samples from the plurality of historical loss assessment images (first-determination module 726), instructions for clustering the plurality of candidate samples into a plurality of class clusters (clustering module 728), instructions for determining a plurality of center candidate sample sets respectively corresponding to class cluster centers of the plurality of class clusters (second determination module 730), instructions for receiving a manual labeling result (receiving module 732), instructions for performing automatic damage classification labeling on other unlabeled candidate samples in each class clusters (labeling module 734), optional instructions for training a damage identification model using the labeled samples (first training module 736), and optional instructions for further training the damage identification model based on received manual corrections (second training module 738).

Data 740 can include historical loss assessment images 742. Loss assessment images 742 can include images in the historical database of an insurance company and images uploaded by ordinary users.

In some embodiments, applications 720 and the various modules in sample-labeling system 722, such as modules 724, 726, 728, 730, 732, 734, 736, and 738 can be partially or entirely implemented in hardware and can be part of processor 702. Further, in some embodiments, the system may not include a separate processor and memory. Instead, in addition to performing their specific tasks, modules 720, 724, 726, 728, 730, 732, 734, 736, and 738, either separately or in concert, may be part of general- or special-purpose computation engines.

Figure 8:
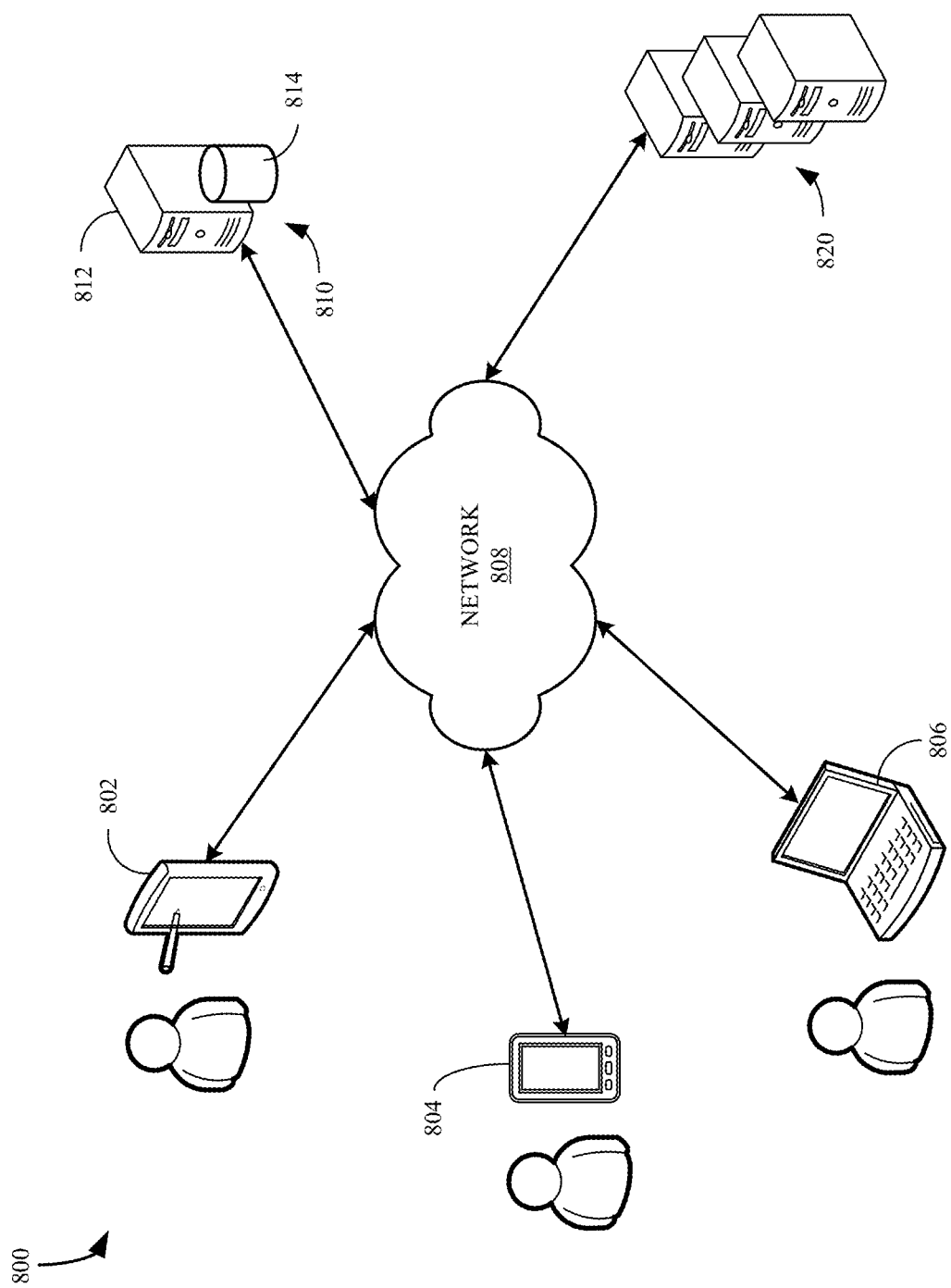
FIG. 8 illustrates an exemplary network environment for implementing the disclosed technology, in accordance with some embodiments described herein.

FIG. 8 illustrates an exemplary network environment for implementing the disclosed technology, in accordance with some embodiments described herein. A network environment 800 includes a number of electronic devices 802, 804 and 806 communicably connected to a server 810 by a network 808. One or more remote servers 820 are further coupled to the server 810 and/or the one or more electronic devices 802, 804 and 806.

In some exemplary embodiments, electronic devices 802, 804 and 806 can be computing devices such as laptop or desktop computers, smartphones, PDAs, wearable devices (e.g., smartwatches, smartglasses, etc.) portable media players, tablet computers, televisions or other displays with one or more processors coupled thereto or embedded therein, or other appropriate computing devices that can be used for displaying a web page or web application. In one example, the electronic devices 802, 804 and 806 store a user agent such as a browser or application. In the example of FIG. 8, electronic device 802 is depicted as a tablet computer, electronic device 804 is depicted as a smartphone, and electronic device 806 is depicted as a laptop computer.

Server 810 includes a processing device 812 and a data store 814. Processing device 812 executes computer instructions stored in data store 814, for example, to assist in scheduling a customer-initiated service or a service-provider-initiated service between a service provider and a customer at electronic devices 802, 804 and 806 during a service scheduling process.

In some exemplary aspects, server 810 can be a single computing device such as a computer server. In other embodiments, server 810 can represent more than one computing device working together to perform the actions of a server computer (e.g., cloud computing). The server 810 may host the web server communicably coupled to the browser at the client device (e.g., electronic devices 802, 804 or 806) via network 808. In one example, the server 810 may host a client application for scheduling a customer-initiated service or a service-provider-initiated service between a service provider and a customer during a service scheduling process. Server 810 may further be in communication with one or more remote servers 820 either through the network 808 or through another network or communication means.

The one or more remote servers 820 may perform various functionalities and/or storage capabilities described herein with regard to the server 810, either alone or in combination with server 810. Each of the one or more remote servers 820 may host various services. For example, servers 820 may host services providing information regarding one or more suggested locations such as web pages or websites associated with the suggested locations, services for determining the location of one or more users or establishments, search engines for identifying results for a user query, one or more user review or query services, or one or more other services providing information regarding one or more establishments, customers and/or reviews or feedback regarding the establishments.

Each of the one or more remote servers 820 can be a single computing device such as a computer server or can represent more than one computing device working together to perform the actions of a server computer (e.g., cloud computing). In one embodiment server 810 and one or more remote servers 820 may be implemented as a single server or a cluster of servers. In one example, server 810 and one or more remote servers 820 may communicate through the user agent at the client device (e.g., electronic devices 802, 804 or 806) via network 808.

Users may interact with the system hosted by server 810, and/or one or more services hosted by remote servers 820, through a client application installed at the electronic devices 802, 804, and 806. Alternatively, the user may interact with the system through a web-based browser application at the electronic devices 802, 804, and 806. Communication among client devices 802, 804, 806 and the system, and/or one or more services, may be facilitated through a network (e.g., network 808).

Communication among the client devices 802, 804, 806, server 810 and/or one or more remote servers 820 may be facilitated through various communication protocols. In some aspects, client devices 802, 804, 806, server 810 and/or one or more remote servers 820 may communicate wirelessly through a communication interface (not shown), which may include digital signal processing circuitry where necessary. The communication interface may provide for communications under various modes or protocols, including Global System for Mobile communication (GSM) voice calls; Short Message Service (SMS), Enhanced Messaging Service (EMS), or Multimedia Messaging Service (MMS) messaging; Code Division Multiple Access (CDMA); Time Division Multiple Access (TDMA); Personal Digital Cellular (PDC); Wideband Code Division Multiple Access (WCDMA); CDMA2000; or General Packet Radio System (GPRS), among others. For example, the communication may occur through a radio-frequency transceiver (not shown). In addition, short-range communication may occur, including via the use of a Bluetooth-enabled device, Wi-Fi®, or another such transceiver.

Network 808 can include, for example, any one or more of a personal area network (PAN), a local area network (LAN), a campus area network (CAN), a metropolitan area network (MAN), a wide area network (WAN), a broadband network (BBN), the Internet, and the like. Further, network 808 can include, but is not limited to, any one or more of the following network topologies, including a bus network, a star network, a ring network, a mesh network, a star-bus network, a tree or hierarchical network, and the like.

Those skilled in the art may be aware that in the aforementioned one or a plurality of examples, the functions described in a plurality of embodiments disclosed by the present specification can be implemented by hardware, software, firmware, or any combination thereof. When implemented by software, these functions may be stored in a computer-readable medium, or transmitted as one or a plurality of instructions or as one or a plurality of pieces of code in the computer-readable medium.

The objectives, the technical schemes, and the beneficial effects of the embodiments disclosed by the present specification are further described in detail in the foregoing specific implementation. It should be understood that the foregoing descriptions are merely specific implementation of embodiments disclosed by the present specification, and are not intended to limit the protection scope of the embodiments disclosed by the present specification. Any modification, equivalent replacement, and improvement made on the basis of the technical schemes of the embodiments of the present specification shall fall within the protection scope of the embodiments of the present specification.

What is claimed is:

1. A computer-executable method for sample labeling, comprising:
    obtaining, by a computer, a plurality of historical loss assessment images;
    obtaining a plurality of candidate samples from the plurality of historical loss assessment images, wherein a respective candidate sample comprises an image of a candidate damage area detected in a corresponding historical loss assessment image;
    clustering the plurality of candidate samples into a plurality of class clusters based on image features of the plurality of candidate samples;
    for a respective class cluster, determining a center candidate sample set corresponding to a class cluster center of the respective class cluster;
    receiving a manual labeling result associated with candidate samples in the determined center candidate sample set; and
    performing, by the computer according to the manual labeling result, damage classification labeling on other unlabeled candidate samples in the respective class cluster to obtain a plurality of labeled samples.

2. The method according to claim 1, wherein the candidate damage area in the corresponding historical loss assessment image is detected using a saliency detection technique, and wherein detecting the candidate damage area further comprises:
    detecting a salient object in the corresponding historical loss assessment image; and determining a minimum rectangular area surrounding the detected salient object.

3. The method according to claim 1, wherein clustering the plurality of candidate samples into a plurality of class clusters comprises:
extracting a feature vector from each of the plurality of candidate samples to obtain a plurality of feature vectors; and
clustering the plurality of feature vectors to obtain the plurality of class clusters.

4. The method according to claim 1, wherein determining the center candidate sample set corresponding to the class cluster center of the respective class cluster comprises:
determining a predetermined number of candidate samples that are closest to the corresponding class cluster center in the respective class cluster, and including the determined predetermined number of candidate samples in the center candidate sample set.

5. The method according to claim 1, further comprising:
using the plurality of labeled samples to train a damage identification model, which is configured to identify damage classifications of vehicle damages from images.

6. The method according to claim 5, further comprising:
selecting a candidate sample from the plurality of candidate samples;
predicting, based on the damage identification model, a damage classification corresponding to the selected candidate sample;
receiving a manual correction of the predicted damage classification;
labeling the selected candidate sample based on the manual correction; and
using the labeled selected candidate sample to perform further training on the damage identification model.

7. The method of claim 5, further comprising:
obtaining a current loss assessment image; and
inputting the current loss assessment image into the damage identification model to predict a damage classification corresponding to the current loss assessment image.

8. An apparatus for sample labeling, the apparatus comprising one or more storage devices and one or more computing devices, the one or more storage devices individually or collectively storing computer executable instructions which when executed by the one or more computing devices configure the one or more computing devices to, individually or collectively, implement units including:
an image-acquisition unit configured to acquire a plurality of historical loss assessment images;
a sample-obtaining unit configured to obtain a plurality of candidate samples from the plurality of historical loss assessment images, wherein a respective candidate sample comprises an image of a candidate damage area detected in a corresponding historical loss assessment image;
a clustering unit configured to cluster the plurality of candidate samples into a plurality of class clusters based on image features of the plurality of candidate samples;
a determining unit configured to determine, for a respective class cluster, a center candidate sample set corresponding to a class cluster center of the respective class cluster;
a receiving unit configured to receive a manual labeling result associated with candidate samples in the determined center candidate sample set; and
a labeling unit configured to perform, according to the manual labeling result, damage classification labeling on other unlabeled candidate samples in the respective class cluster to obtain a plurality of labeled samples.

9. The apparatus according to claim 8, wherein the sample-obtaining unit further comprises a candidate-damage-area-determining unit configured to:
detect a salient object in the corresponding historical loss assessment image; and
determine the candidate damage area by determining a minimum rectangular area surrounding the detected salient object.

10. The apparatus according to claim 8, wherein the clustering unit is configured to:
extracting a feature vector from each of the plurality of candidate samples to obtain a plurality of feature vectors; and
clustering the plurality of feature vectors to obtain the plurality of class clusters.

11. The apparatus according to claim 8, wherein the determining unit is configured to:
determine a predetermined number of candidate samples that are closest to the corresponding class cluster center in the respective class cluster, and
include the determined predetermined number of candidate samples in the center candidate sample set.

12. The apparatus according to claim 8, wherein the units further include a first training unit configured to use the plurality of labeled samples to train a damage identification model, which is configured to identify damage classifications of vehicle damages from images.

13. The apparatus according to claim 12, wherein the units further include a second training unit configured to:
select a candidate sample from the plurality of candidate samples;
predict, based on the damage identification model, a damage classification corresponding to the selected candidate sample;
receive a manual correction of the predicted damage classification;
label the selected candidate sample based on the manual correction; and
use the labeled selected candidate sample to perform further training on the damage identification model.

14. The apparatus according to claim 12, wherein the units further include:
a second image-acquisition unit configured to acquire a current loss assessment image; and
a predicting unit configured to input the current loss assessment image into the damage identification model to predict a damage classification corresponding to the current loss assessment image.

15. A non-transitory computer-readable storage medium storing instructions that when executed by one or more computers cause the one or more computers to, individually or collectively, perform a method for sample labeling, the method comprising:
obtaining a plurality of historical loss assessment images;
obtaining a plurality of candidate samples from the plurality of historical loss assessment images, wherein a respective candidate sample comprises an image of a candidate damage area detected in a corresponding historical loss assessment image;
clustering the plurality of candidate samples into a plurality of class clusters based on image features of the plurality of candidate samples;

for a respective class cluster, determining a center candidate sample set corresponding to a class cluster center of the respective class cluster;

receiving a manual labeling result associated with candidate samples in the determined center candidate sample set; and performing, according to the manual labeling result, damage classification labeling on other unlabeled candidate samples in the respective class cluster to obtain a plurality of labeled samples.

16. The non-transitory computer-readable storage medium according to claim 15, wherein the candidate damage area in the corresponding historical loss assessment image is detected using a saliency detection technique, and wherein detecting the candidate damage area further comprises:

detecting a salient object in the corresponding historical loss assessment image; and determining a minimum rectangular area surrounding the detected salient object.

17. The non-transitory computer-readable storage medium according to claim 15, wherein clustering the plurality of candidate samples into a plurality of class clusters comprises:

extracting a feature vector from each of the plurality of candidate samples to obtain a plurality of feature vectors; and clustering the plurality of feature vectors to obtain the plurality of class clusters.

18. The non-transitory computer-readable storage medium according to claim 15, wherein determining the center candidate sample set corresponding to the class cluster center of the respective class cluster comprises:

determining a predetermined number of candidate samples that are closest to the corresponding class cluster center in the respective class cluster, and including the determined predetermined number of candidate samples in the center candidate sample set.

19. The non-transitory computer-readable storage medium according to claim 15, wherein the method further comprises:

using the plurality of labeled samples to train a damage identification model, which is configured to identify damage classifications of vehicle damages from images.

20. The non-transitory computer-readable storage medium according to claim 19, wherein the method further comprises:

selecting a candidate sample from the plurality of candidate samples;

predicting, based on the damage identification model, a damage classification corresponding to the selected candidate sample;

receiving a manual correction of the predicted damage classification;

labeling the selected candidate sample based on the manual correction; and using the labeled selected candidate sample to perform further training on the damage identification model.

* * * * *